3,211,706
PROCESS FOR THE MANUFACTURE OF LINEAR POLYAMIDES OF β-AMINOCARBOXYLIC ACIDS
Karl Börner, Bobingen, near Augsburg, Germany, assignor to Farbwerke Hoechst Aktiengesellschaft vormals Meister Lucius & Brüning, Frankfurt am Main, Germany, a corporation of Germany
No Drawing. Filed Dec. 2, 1960, Ser. No. 73,213
Claims priority, application Germany, Dec. 5, 1959, F 30,008
4 Claims. (Cl. 260—78)

The present invention relates to a process for the manufacture of linear polyamides of β-aminocarboxylic acids.

It has already been proposed to prepare linear polyamides of high molecular weight of β-aminocarboxylic acids by polymerizing β-lactams that are unsubstituted at the nitrogen and carry at least one hydrogen atom in alpha-position to the carbonyl group in the presence of small amounts of the lactamate, corresponding to the β-lactam, of a strong base. In many cases the polymers of β-lactams thus obtained have an insufficient degree of polymerization when the temperature in the polymerization mixture exceeds 50–60° C. Moreover, the polymerization of β-lactams in the presence of lactamates as catalysts has the disadvantage that in many cases the induction periods are especially long. The induction period is the time which elapses from the addition of the catalyst to the beginning of the sudden increase of the temperature indicating the start of the polymerization. Depending on the nature and the amount of the catalyst a variation of the induction period of 20 to more than 60 minutes must be taken into account. If the polymerization of the aforesaid β-lactams shall be carried out in the presence of small amounts of catalyst and at low temperature, it may happen that it does not set in at all.

The present invention provides a process for the manufacture of linear polyamides of β-aminocarboxylic acids, which comprises polymerizing in an organic inert solvent β-lactams that are unsubstituted at the nitrogen and carry at least one hydrogen atom in alpha-position to the carbonyl group in the presence of 0.001 to 0.02 and preferably 0.006 to 0.01 mol of at least one lactamate of a strong base and 0.00005 to 0.0006 mol of a N-acyl derivative of a lactam, preferably a N-acetyl derivative.

It is known that acyl lactams initiate a rapid polymerization of lactams with a higher number of members such as, for example, of pyrrolidone and piperidone. However, this polymerization can only be carried out under extreme conditions with metallic sodium or alkali metal lactamate at higher temperatures, for example at 180 to 270° C., in the presence of great amounts of initiator. It was, therefore, surprising that valuable, highly viscous polyamides of β-aminocarboxylic acids could be obtained by polymerizing β-lactams that are unsubstituted at the nitrogen and carry at least one hydrogen atom in alpha-position to the carbonyl group in the presence of 0.001 to 0.02 and preferably 0.006 to 0.01 mol of a lactamate of a strong base and 0.00005 to 0.0006 mol of a N-acyl derivative of a lactam, suitably a N-acetyl derivative. Especially suitable acyl derivatives of lactams, which act as initiators in the polymerization, are acyl derivatives of lactams containing 3 to 8 carbon atoms and preferably 3 to 6 carbon atoms in the lactam ring.

As initiators in the process of the invention are furthermore suitable compounds that react with the β-lactams to be polymerized with the formation of acyl lactams, for example acetic anhydride, diacetyl amine or triacetyl amine.

The process of the present invention has the great advantage that the polymerization of β-lactams in the presence of at least one lactamate and with very minor additions of acyl lactamates can be carried out without a noteworthy induction period. The polymerization sets in at once after the addition of the catalyst and the polymerization heat simultaneously evolved can be dissipated from the still liquid polymerization mixture by stirring. In other words, the polymerization can be carried out without induction period in a relatively short time while heat accumulation does not occur. By the addition of the N-acyl lactams in accordance with the invention also the duration of the polymerization is reduced.

The viscosity, that is to say the size of the molecules of the β-polyamides can be regulated by the amount of N-acyl derivatives of lactams added in the polymerization. With increasing amounts (more than 0.006 mol) of the acyl compound and with a constant catalyst quantity (alkali metal lactamate) the polymerization velocity increases very rapidly while the viscosity of the polymers is reduced. Obviously too many germs promoting chain growth are formed so that the processes of chain growth taking place very rapidly sooner comes to a standstill. Also a chain cleavage reaction must be taken into consideration when too high an amount of acyl compound is added. For example, in the polymerization of β-methyl-β-butyrolactam with 0.0002 mol of acetyl-pyrrolidone as initiator and 0.007 mol of potassium pyrrolidone as catalyst a very highly viscous polymer is obtained, whereas in the polymerization with 0.0006 mol of acetyl-pyrrolidone and the same amount of potassium pyrrolidone the polymers formed have only an average viscosity.

Suitable solvents are benzene, xylene, chlorobenzene, tetrahydrofurane, dimethyl-formamide and dimethyl-sulfoxide. Dimethyl-sulfoxide has a great dissolving power and therefore leads to polymers having the highest viscosity. The polymers separate from said solvent relatively late during the polymerization and in a strongly swollen state so that the molecules have a longer time to grow in a dimethyl-sulfoxide solution than in the other solvents listed above. Dimethyl-sulfoxide crystallizes at 15° C. so that the polymerization in this solvent cannot be carried out below said temperature. With the use of tetrahydrofurane, however, products of lower viscosity are obtained at −10° C.

Depending on the desired viscosity of the polymers the polymerization can be carried out at a temperature in the range from −15° C. to +30° C. When products having a high viscosity are to be produced, it is of advantage to operate in the presence of dimethylsulfoxide as solvent at a temperature of 15 to 20° C.

It is suitable to adjust the amount of the lactamate added to the amount of acyl compound added. A reduction of the amount of catalyst permits, in general, an increase of the amount of initiator. In addition to the fact that no induction period occurs and that the polymerization is accelerated, the use of N-acyl lactams offers further advantages. The N-acyl lactams improve the manufacture of copolymers of β-lactams.

It has been found that the polymerization speed of the individual β-lactams may considerably vary. β-Phenyl-propiolactam polymerizes, for example, much more rapidly than β-methyl-β-butyrolactam or β-methyl-β-caprolactam so that in the manufacture of copolymers of the aforesaid monomers the polymerization of the β-phenyl-propiolactam is always well in advance and during the polymerization two peaks of heat evolution can be observed. Only β-lactams having the same polymerization speed, such as β-methyl-β-butryolactam and β-methyl-β-caprolactam, can be polymerized by the known methods to yield typical copolymers having characteristic solubility properties. By the small additions of N-acyl lactams the polymerization speed of the two lactams mentioned can be accelerated in a manner such that a copolymerization of β-phenyl-propiolactam with β-methyl-β-butyrolactam or β-methyl-β-caprolactam is possible.

A copolymer of β-methyl-β-butyrolactam, β-methyl-β-caprolactam and β-phenyl-propiolactam can suitably be produced by adding to a mixture of the slower polymerizing lactams, i.e., the β-methyl-β-butyrolactam and the β-methyl-β-caprolactam, the total amount of the lactamate used as catalyst and of the initiator (acyl compounds of the lactams) and by adding, after the beginning of the polymerization, which sets in at once and which can be perceived by a slight increase of the temperature, the portion of β-phenyl-propiolactam while stirring vigorously.

The order to succession in which the catalyst and the initiator are added is not critical. In general, the alkaline catalyst is first added and when it has dissolved in the polymerization mixture the initiator is added.

Instead of lactamates there can be used as catalyst also those alkaline substances which form lactamates with β-lactams, for example sodium powder, sodium hydride, potassium hydride or lithium hydride. When β-polyamides having a low viscosity shall be produced for certain purposes there can be used as catalysts alkali metal hydrides, alkali metal alcoholates, Grignard compounds and alkali metal amides.

The following examples serve to illustrate the invention, but they are not intended to limit it thereto.

*Example 1*

24 grams of β-methyl-β-butyrolactam were dissolved in 85 cc. of dimethyl-sulfoxide and 25 cc. of the solvent were distilled off under reduced pressure in order to remove the last traces of water. The solution was then cooled in a bath to 20° C. and with the exclusion of moisture and oxygen 220 milligrams of potassium pyrrolidone (catalyst) were added while stirring. When the catalyst had dissolved, 7 milligrams of the N-acetyl derivative of β-methyl-β-butyrolactam (initiator) were added while stirring. During the addition of the catalyst and of the initiator the reaction vessel remained in the cooling bath of 20° C. to dissipate the reaction heat. In spite of this measure the temperature of the polymerization mixture rose to 28° C. in the course of 35 minutes. After 17 minutes the mixture became solid, so that stirring had to be interrupted. The temperature then decreased slowly to the temperature of the cooling bath, i.e. 20° C. After having been allowed to stand for 12 hours, the tough mass was suspended in water and methyl alcohol, washed and dried under reduced pressure.

21.5 grams of polymer were obtained having a relative viscosity of 7.4 at 20° C. as a 1% solution in concentrated sulfuric acid. When 14 milligrams of initiator were used instead of 7 milligrams, the relative viscosity of the polymer was reduced to 5.2 and with the use of 25 milligrams of initiator to 3.5. Without the use of a N-acyl compound, the product obtained had a relative viscosity of 4.8. In this case the temperature rose to 23° C. only after 2 hours. The polyamide obtained was well suitable for the manufacture of fibers and foils.

*Example 2*

The polymerization was carried out in a vessel of stainless steel having a capacity of 5.5 liters and being provided with a vacuum tight cover with stirrer. The empty apparatus was first freed from the last traces of water with standing stirrer in an oil bath of 165° C., while passing through hot dry nitrogen and then by evacuating it to a pressure of about 0.2 mm. of mercury. The evacuation lasted for 6 hours. The apparatus was then allowed to cool under reduced pressure, and the vacuum was compensated by the introduction of dry nitrogen. Before charging the vessel, a vigorous, severely dried nitrogen current was passed through and escaped by way of the supply tube which was now open. By way of said supply tube the vessel was then charged, with the exclusion of moisture, with 650 grams of β-methyl-β-butyrolactam and 2 liters of dimethyl-sulfoxide having a water content of 0.009%. In order to eliminate the last traces of water, 375 cc. of dimethyl-sulfoxide were distilled off at an oil bath temperature of 90–92° C. and under a pressure of 0.1–0.2 mm. of mercury. Severely dried nitrogen was then allowed to flow in under reduced pressure, the oil bath was replaced by a cooling bath of 15° C., the polymerization mixture was cooled to 15° C. and after having switched on the stirrer there were added 6.5 grams of potassium pyrrolidone as catalyst and 55 milligrams of acetyl-β-methyl-β-butyrolactam as initiator. The polymerization set in after a few minutes while the temperature of the polymerization mixture rose to 17–18° C. at a cooling bath temperature of 15° C.

The solution became gradually viscous. The speed of rotation of the stirrer (90 revolutions per minute) was maintained constant by means of a variable resistor at the stirring motor.

After 7 hours of polymerization, the stirrer was switched off. After said time the temperature in the polymerization vessel had again dropped to 16–17° C. The polymerization mixture was then allowed to stand for 17 hours, whereupon the solid mass was worked up as described in Example 1. 610 grams (94%) of polymer were obtained having a relative viscosity of 13.6 at 20° C. as a 1% solution in concentrated sulfuric acid.

*Example 3*

12 grams of β-methyl-β-butyrolactam and 12 grams of β-methyl-β-caprolactam were dissolved in 85 cc. of dimethyl-sulfoxide and 25 cc. of dimethyl-sulfoxide were distilled off under reduced pressure. The solution was cooled to 20° C. and in a nitrogen atmosphere 180 milligrams of lithium pyrrolidone were added with the exclusion of moisture and oxygen. When the catalyst had dissolved, 7 milligrams of N-acetyl-caprolactam were added, whereupon the temperature rose to 21° C. within 3 minutes and to 24° C. within a further 7 minutes. The temperature then slowly dropped to 20° C. During the polymerization the mixture was stirred. Since the copolymer formed remained in solution, the progress of the polymerization could be perceived by the increase of the viscosity of the polymerization mixture. After a further 10 hours the polymer was precipitated with water, after comminution of the polymer the dimethyl-sulfoxide was washed out with much water and the polymer was dried under reduced pressure. 19 grams of polymer were obtained (79% of the theory) having a relative viscosity of 8.1 at 20° C. as a 1% solution in concentrated sulfuric acid. The polymer was readily soluble in alcohol.

When the polymerization was carried out without oxygen being excluded, the polymer had only a slightly inferior relative viscosity of 7.6 in concentrated sulfuric acid, which did not impair the workability of the polymer into fibers and foils.

*Example 4*

10 grams of β-methyl-β-butyrolactam and 10 grams of β-methyl-β-caprolactam were dissolved in 80 cc. of dimethyl-sulfoxide and 30 cc. of the solvent were distilled off under reduced pressure. The solution was then cooled in a thermostat to 20° C. and with the exclusion of moisture and oxygen and while stirring in a nitrogen atmosphere 220 milligrams of potassium pyrrolidone were added. When the catalyst had dissolved, 18 milligrams of N-acetyl-pyrrolidone were added. After 2 minutes the temperature of the mixture rose from 20° C. to 21° C. whereupon under intensified stirring 10 grams of β-phenyl-propiolactam were added in the form of a solution in 25 cc. of dimethyl-sulfoxide. After a further 2 minutes the polymerization had proceeded to an extent such that the mixture gelatinized at a temperature of 32° C. After a further 5 minutes the temperature reached a maximum value of 39° C. and then dropped slowly to 20° C.

The polymerization mixture was allowed to stand for 12 hours at 20° C., the transparent tough mass was comminuted, suspended with water, the adhering dimethylsulfoxide was washed out with a large amount of water and the polymer was dried under reduced pressure.

19.8 grams (66% of the theory) of polymer were obtained having a relative viscosity of 16 as a 1% solution in concentrated sulfuric acid. The polymer was insoluble in alcohol and was suitable for the manufacture of extrusion molded articles.

I claim:
1. A process for the manufacture of linear polyamides of beta-amino-carboxylic acids, which comprises polymerizing in dimethyl sulfoxide beta-lactams which are unsubstituted at the nitrogen atom and carry at least one hydrogen atom in alpha-position to the carbonyl group, in the presence of 0.001 to 0.02 mol of at least one alkali metal lactamate and 0.00005 to 0.0006 mol of an N-acyl derivative selected from the group consisting of the acetyl and benzoyl derivative of a lactam containing 3 to 8 carbon atoms in the lactam ring, at a temperature within the range of 15–25° C., the resulting polyamide having a relative viscosity of at least 7.0 measured as a 1% by weight solution in concentrated sulfuric acid at 20° C.

2. The process of claim 1 wherein said N-acyl derivative is the N-acetyl derivative.

3. The process of claim 1 which comprises employing 0.006 to 0.01 mol of at least one alkali metal lactamate and 0.00005 to 0.0006 mol of an N-acyl derivative of a lactam.

4. The process of claim 1 which comprises initiating the polymerization at ambient temperature and limiting the temperature attained during polymerization to a maximum of 39° C.

References Cited by the Examiner

UNITED STATES PATENTS

| | | | |
|---|---|---|---|
| 2,333,752 | 11/43 | Ufer | 260—78 |
| 2,500,317 | 3/50 | Lincoln | 260—78 |
| 2,691,643 | 10/54 | Chirtel | 260—78 |
| 2,739,959 | 3/56 | Ney et al. | 260—78 |
| 2,957,852 | 10/60 | Frankenburg | 260—78 |
| 3,037,001 | 5/62 | Beeke et al. | 260—78 |
| 3,093,618 | 6/63 | Graf et al. | 260—78 |

WILLIAM H. SHORT, *Primary Examiner.*

MILTON STERMAN, LOUISE P. QUAST, *Examiners.*